(12) United States Patent
Xu et al.

(10) Patent No.: US 11,733,476 B2
(45) Date of Patent: Aug. 22, 2023

(54) OPTICAL IMAGING LENS

(71) Applicant: GENIUS ELECTRONIC OPTICAL (XIAMEN) CO., LTD., Fujian (CN)

(72) Inventors: Kun Xu, Fujian (CN); Zhenmu Chen, Fujian (CN); Haibin Zhan, Fujian (CN); Qiya Lin, Fujian (CN); Zhizhong Ji, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 479 days.

(21) Appl. No.: 17/098,461

(22) Filed: Nov. 16, 2020

(65) Prior Publication Data
US 2022/0113489 A1    Apr. 14, 2022

(30) Foreign Application Priority Data

Oct. 13, 2020 (CN) .......................... 202011089380.2

(51) Int. Cl.
G02B 7/02 (2021.01)
(52) U.S. Cl.
CPC ............. *G02B 7/022* (2013.01); *G02B 7/025* (2013.01); *G02B 7/026* (2013.01)

(58) Field of Classification Search
CPC ........ G02B 7/022; G02B 7/025; G02B 7/026; G02B 13/0045; G02B 7/021
See application file for complete search history.

(56) References Cited

U.S. PATENT DOCUMENTS

2020/0110275 A1\*  4/2020  Tang .......................... G02B 9/34

\* cited by examiner

*Primary Examiner* — James C. Jones
(74) *Attorney, Agent, or Firm* — JCIPRNET

(57) ABSTRACT

An optical imaging lens, sequentially including at least one lens element and an optical ring element from an object side to an image side along an optical axis, is provided. The optical ring element is located on a side of the lens element closest to the image side and facing the image side, and has an object-side bearing surface facing the object side and in contact with the closest lens element. The object-side bearing surface has an object-side outer periphery and an object-side inner periphery, and the object-side inner periphery is located between the optical axis and the object-side outer periphery. The object-side bearing surface has at least one groove, and the at least one groove extends to the object-side inner periphery along a radial direction.

20 Claims, 18 Drawing Sheets

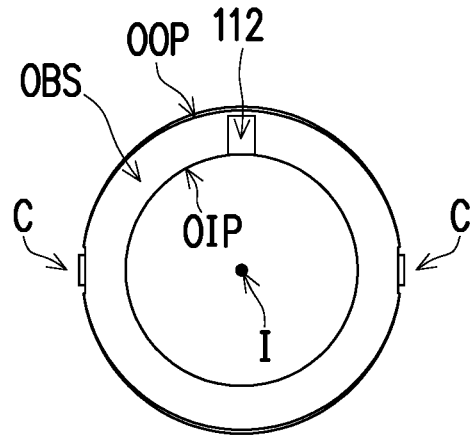
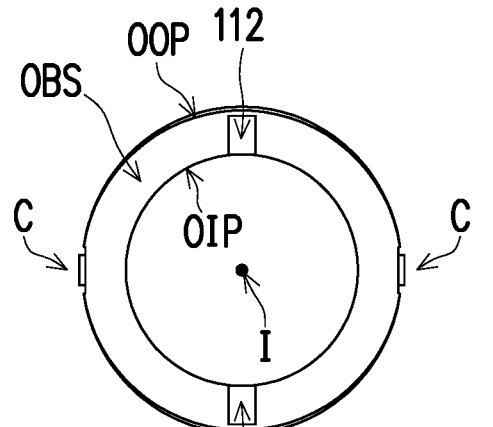
FIG. 4A         FIG. 4B
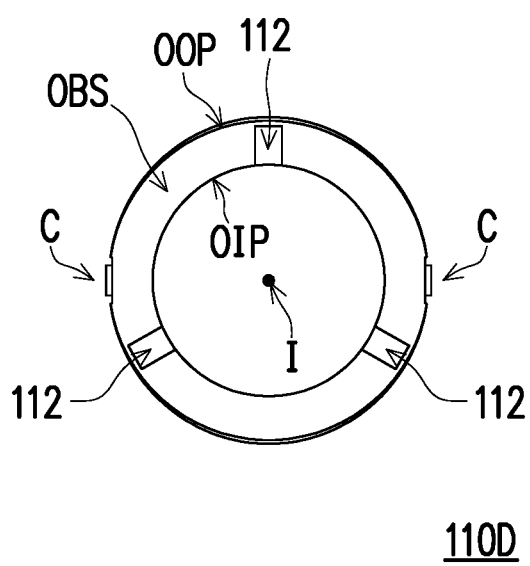
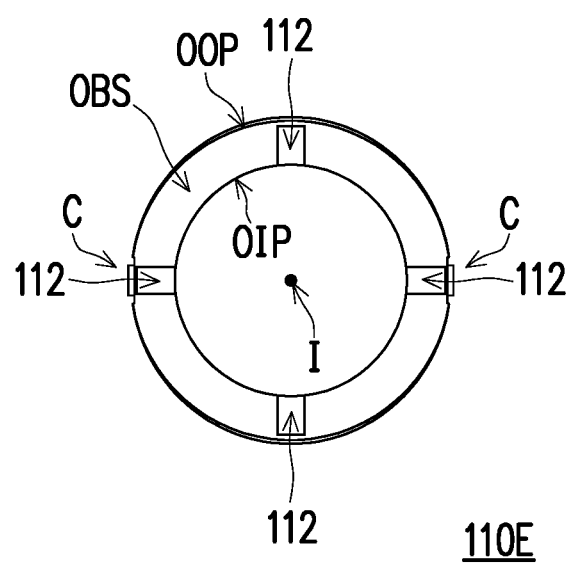
FIG. 4C         FIG. 4D

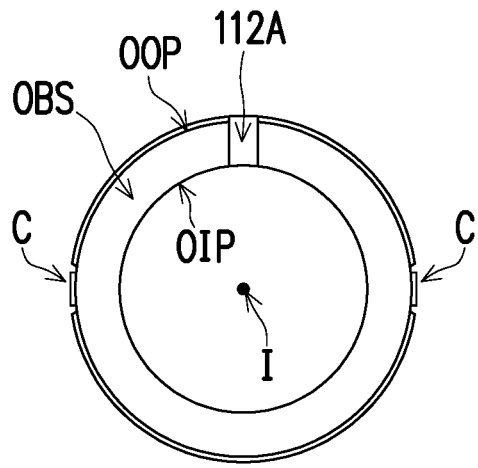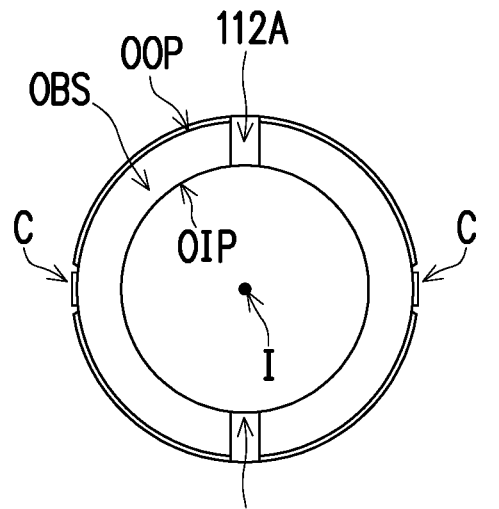
FIG. 6A　　　　　　FIG. 6B
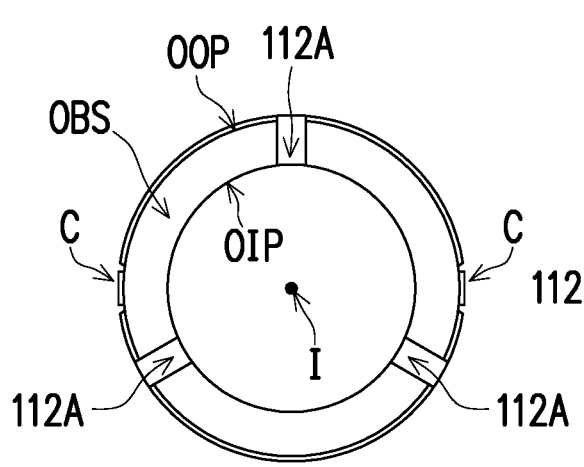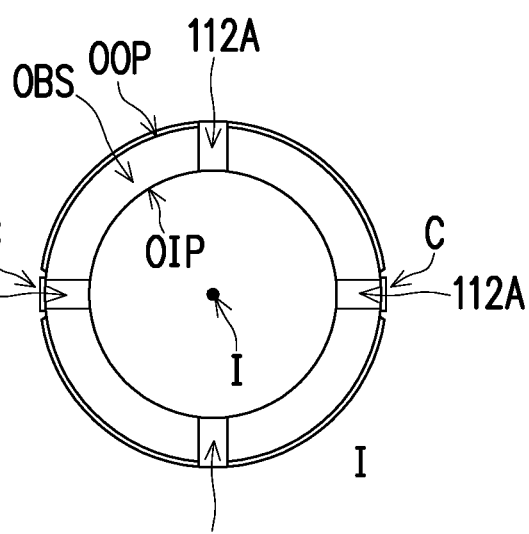
FIG. 6C　　　　　　FIG. 6D

OPTICAL IMAGING LENS

CROSS-REFERENCE TO RELATED APPLICATION

This application claims the priority benefit of China application no. 202011089380.2, filed on Oct. 13, 2020. The entirety of the above-mentioned patent application is hereby incorporated by reference herein and made a part of this specification.

BACKGROUND

Technical Field

The disclosure relates to an optical device, and more particularly to an optical imaging lens.

Description of Related Art

In recent years, optical imaging lenses have continued to evolve. In addition to the requirements for light, thin, short, and small lens, the imaging quality of the lens is also important. In addition to the surface shape of the lens element or the air gap between the lens elements that affect the optical imaging quality, the smoothness of the glue dispensing procedure of the lens element and optical ring element during assembly is also a major factor affecting the optical imaging quality.

When the conventional optical imaging lens is assembled, the lens element and the bearing surface of the optical ring element are in full-surface contact, that is, there is no gap between each other. In the glue dispensing process, the lens element or optical ring element is bonded to the lens barrel through an adhesive solvent, but this adhesive solvent easily forms a thin film at the cutout of the optical ring element or lens element. When the adhesive solvent chemically reacts with the lens element or lens barrel, the air in the enclosed space formed during the assembly of these optical elements (such as the lens element, optical ring element, or lens barrel) will expand due to heating. At this time, the thin film of the adhesive solvent at the cutout of the optical ring element or lens element will be broken and sputtered onto the effective portion of the lens element due to air expansion, thereby affecting the optical imaging quality. In view of this, the disclosure proposes a technically feasible optical imaging lens that can improve the problem of adhesive solvent sputtering by exhaust while maintaining good optical imaging quality.

SUMMARY

The disclosure provides an optical imaging lens, which has a good exhaust effect and can improve the problem of adhesive solvent sputtering.

The disclosure provides an optical imaging lens, which sequentially includes at least one lens element and an optical ring element from an object side to an image side along an optical axis. The optical ring element is located on the side facing the image side of the lens element closest to the image side and has an object-side bearing surface facing the object side and in contact with the closest lens element. The object-side bearing surface has an object-side outer periphery and an object-side inner periphery, and the object-side inner periphery is located between the optical axis and the object-side outer periphery. The object-side bearing surface has at least one groove, and the at least one groove extends at least to the object-side inner periphery along a radial direction.

The disclosure also provides an optical imaging lens, which includes a plurality of lens elements and an optical ring element sequentially arranged from an object side to an image side along an optical axis. The optical ring element is located between adjacent lens elements. The optical ring element has an object-side bearing surface and an image-side bearing surface respectively facing the object side and the image side, and in contact with the lens elements. The object-side bearing surface has an object-side outer periphery and an object-side inner periphery, and the object-side inner periphery is located between the optical axis and the object-side outer periphery. The image-side bearing surface has an image-side outer periphery and an image-side inner periphery, and the image-side inner periphery is located between the optical axis and the image-side outer periphery. At least one of the object-side bearing surface and the image-side bearing surface has at least one groove, and the at least one groove extends at least from the object-side outer periphery at least to the object-side inner periphery along a radial direction or extends at least from the image-side outer periphery at least to the image-side inner periphery along the radial direction.

The disclosure also provides an optical imaging lens, which includes at least one lens element. Each at least one lens element has an object-side mechanical surface and an image-side mechanical surface respectively facing an object side and an image side. Both the object-side mechanical surface and the image-side mechanical surface are used to receive a bearing force. The object-side mechanical surface has an object-side outer boundary and an object-side inner boundary. The object-side inner boundary is located between an optical axis and the object-side outer boundary. The image-side mechanical surface has an image-side outer boundary and an image-side inner boundary, and the image-side inner boundary is located between the optical axis and the image-side outer boundary. At least one of the object-side mechanical surface and the image-side mechanical surface has at least one groove. The length of the at least one groove in a radial direction is greater than or equal to the length of at least one of the object-side mechanical surface and the image-side mechanical surface in the radial direction.

Based on the above, in the optical imaging lens of the embodiments of the disclosure, the groove design may provide a passage, so that the air in the enclosed space formed during the assembly of the lens barrel and the optical ring element can be eliminated, so as to prevent the problem of adhesive solvent sputtering at the cutout of the optical ring element due to failed ventilation of heated and expanded air in the enclosed space during glue dispensing, which affects the optical imaging quality.

In order to make the above-mentioned features and advantages of the disclosure more comprehensible, the following specific embodiments are described in detail in conjunction with the accompanying drawings.

BRIEF DESCRIPTION OF THE DRAWINGS

FIGS. 4A to 4D are respectively top-view schematic diagrams of optical ring elements according to different embodiments of the disclosure.

FIGS. 6A to 6D are respectively top-view schematic diagrams of optical ring elements according to different embodiments of the disclosure.

DETAILED DESCRIPTION OF DISCLOSED EMBODIMENTS

Figure 1:
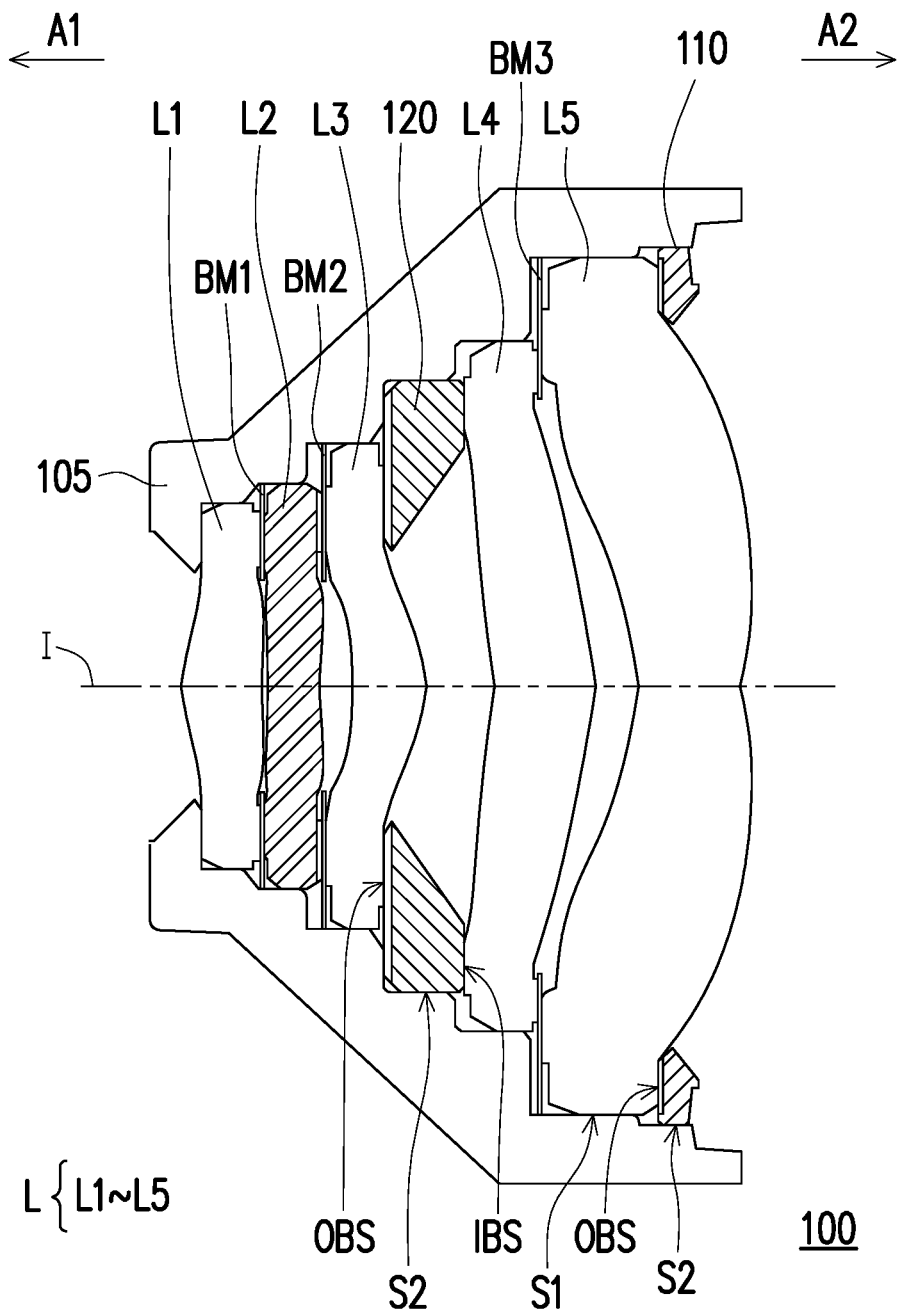
FIG. 1 is a schematic diagram of an optical imaging lens according to an embodiment of the disclosure.

FIG. 1 is a schematic diagram of an optical imaging lens according to an embodiment of the disclosure. Please refer to FIG. 1. In this embodiment, an optical imaging lens 100 is mainly used to capture images and record videos, and is, for example, a portable electronic device such as a mobile phone, camera, tablet, or personal digital assistant (PDA), but the disclosure is not limited thereto. The optical imaging lens 100 has an optical axis I and includes a lens barrel 105, a plurality of lens elements L, a plurality of light-shielding elements BM, and a plurality of optical ring elements 110 and 120. The optical ring element 110 is, for example, a fixed ring, and the optical ring element 120 is, for example, a spacer, but the disclosure is not limited thereto. The above elements will be described in detail in the following paragraphs.

The lens barrel 105 refers to an element for mounting the lens elements L, and has a function of protecting the lens elements L and the optical path inside the optical imaging lens 100.

Each of the lens elements L (or lens) is, for example, an optical element with refracting power. In this embodiment, the optical imaging lens 100 includes, for example, five lens elements L1 to L5. In other embodiments, the number may be six, seven, more than eight, or less than five, such as three or four. The number is only an example, and the disclosure is not limited to the number of lens elements.

Figure 2A:
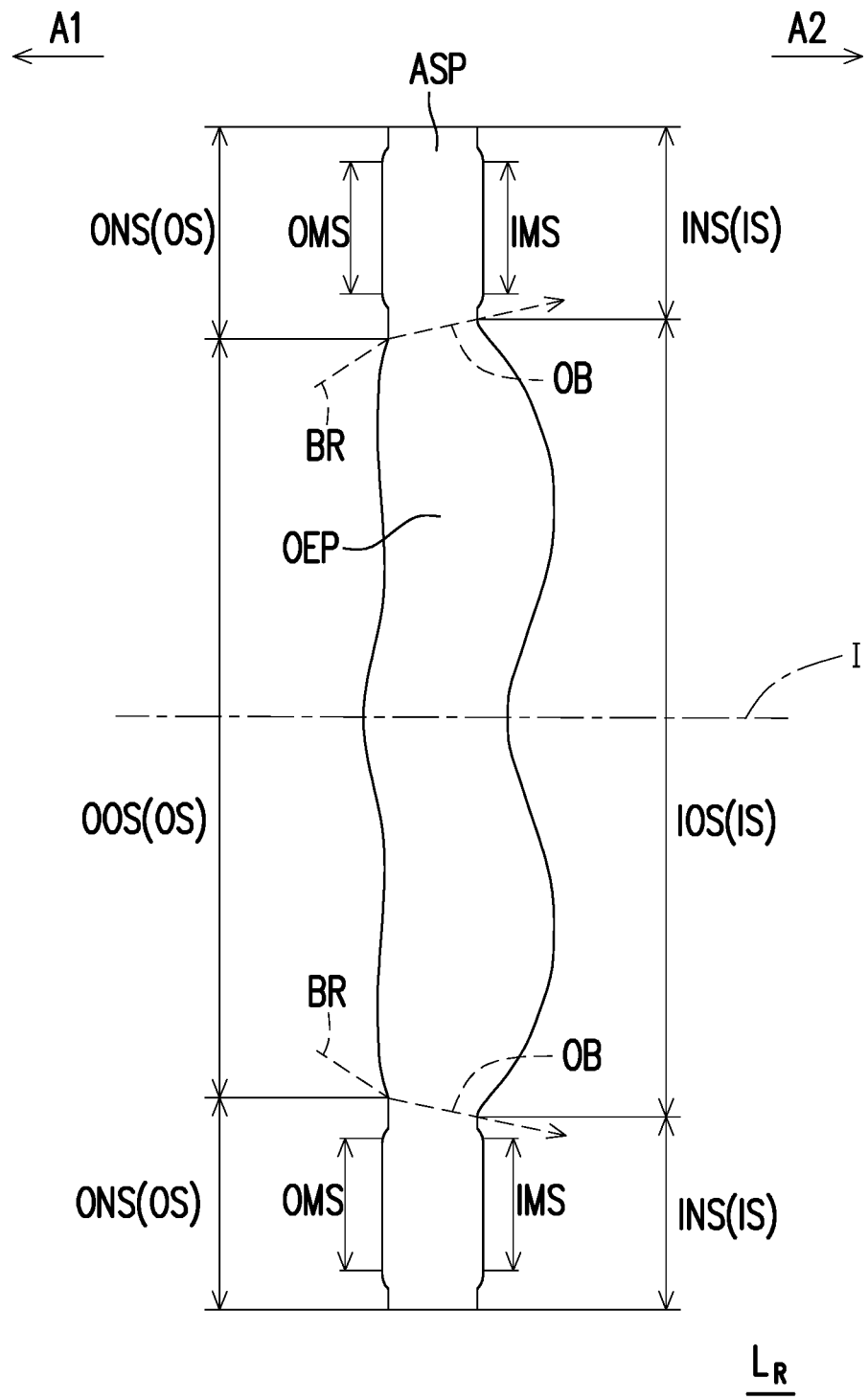
FIG. 2A and FIG. 2B are respectively radial schematic diagrams of different reference lens elements applicable to an optical imaging lens according to an embodiment of the disclosure.
Figure 2B:
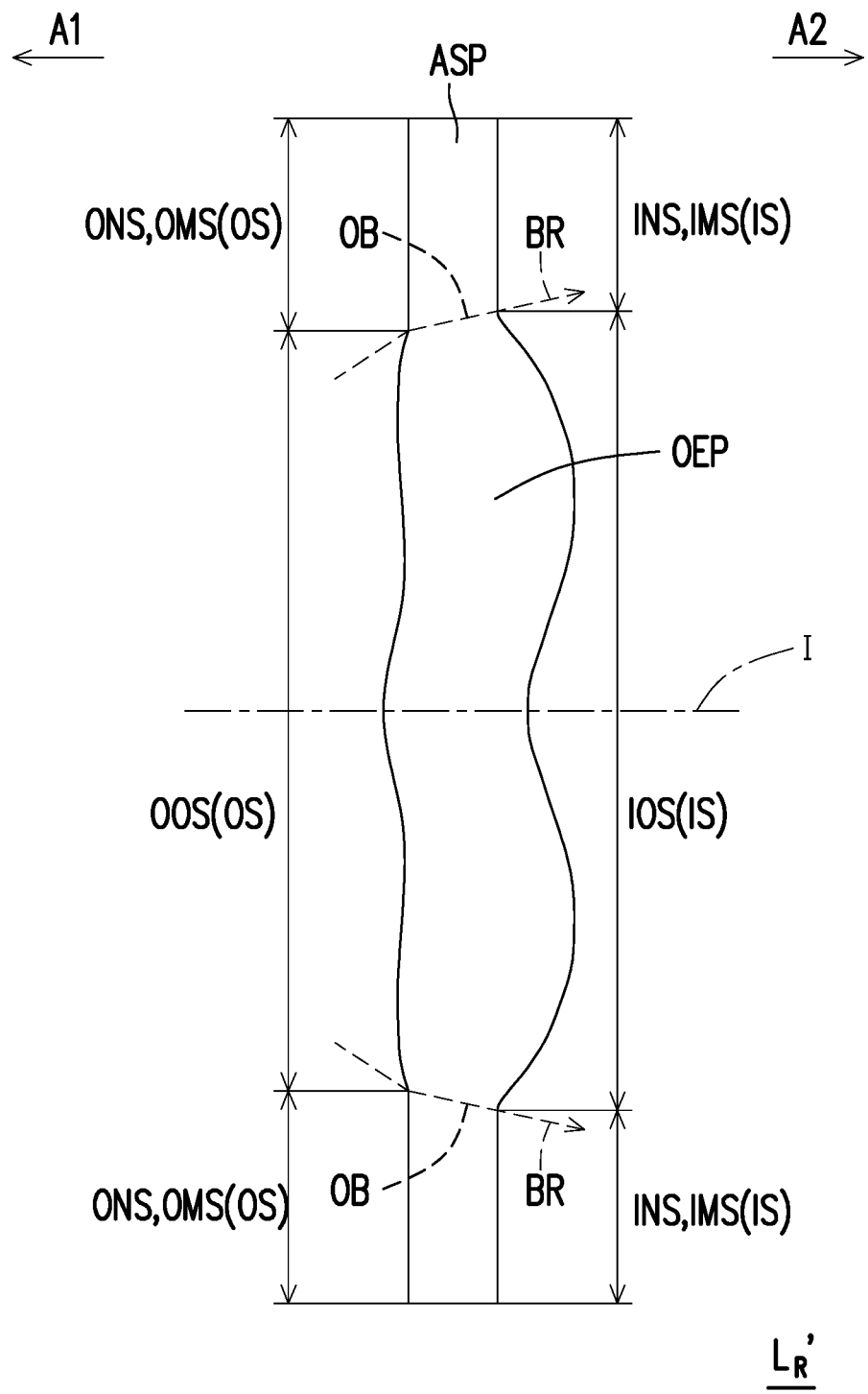

FIG. 2A and FIG. 2B are respectively radial schematic diagrams of different reference lens elements applicable to an optical imaging lens according to an embodiment of the disclosure. Please refer to FIG. 2A and FIG. 2B. Reference lens elements $L_R$ and $L_R'$ of FIGS. 2A and 2B are taken as examples of the lens element L shown in FIG. 1. In detail, the reference lens elements $L_R$ and $L_R'$ (or each lens element L) has a first surface OS facing an object side A1 and a second surface IS facing an image side A2. In the first surface OS and the second surface IS, according to different functions, the first surface OS further includes an object-side optically effective surface OOS and an object-side optically noneffective surface ONS connected to each other, and the second surface IS further includes an image-side optically effective surface IOS and an image-side optically noneffective surface INS connected to each other. The object-side optically effective surface OOS and the image-side optically effective surface IOS are defined as the surfaces through which imaging rays BR pass. The imaging rays BR do not pass through the object-side optically noneffective surface ONS and the image-side optically noneffective surface INS. In the following paragraphs, the descriptions will be divided according to surfaces of different functions.

Assuming that the reference lens elements $L_R$ and $L_R'$ may accept the imaging rays BR incident on the optical imaging lens 100 in an angle from being parallel to the optical axis I to a half field of view (HFOV) relative to the optical axis I, and after sequentially passing through a portion of the first surface OS and the second surface IS of the lens elements $L_R$ and $L_R'$, the imaging rays BR form an image on an imaging surface (not shown) at the rear end. A portion of the first surface OS passed through by the imaging rays BR is the object-side optically effective surface OOS, and a portion of the second surface IS passed through by the imaging rays BR is the image-side optically effective surface IOS. The path along which the imaging rays BR is incident on the lens element $L_R$ at the maximum angle inside the lens elements $L_R$ and $L_R'$ is defined as an optical boundary OB. From another perspective, a portion of the entire lens elements $L_R$ and $L_R'$ passed through by the imaging rays BR is referred to as an optically effective portion OEP. The surface of the optically effective portion OEP facing the object side A1 is referred to as the object-side optically effective surface OOS, and the surface facing the image side A2 is referred to as the image-side optically effective surface IOS.

In addition, the lens elements $L_R$ and $L_R'$ include an assembly portion ASP extending radially outward from the optical boundary OB. The assembly portion ASP is generally used for assembling the lens elements $L_R$ and $L_R'$ to the lens barrel 110. The imaging rays BR do not reach the assembly portion ASP, so the assembly portion ASP may also be referred to as the optically noneffective portion in the lens elements $L_R$ and $L_R'$. The surface in the assembly portion ASP facing the object side A1 is the object-side optically noneffective surface ONS, and the surface facing the image side A2 is the image-side optically noneffective surface INS. Since the assembly portion ASP is the main force-bearing portion of the lens elements $L_R$ and $L_R'$, at least a portion of the object-side optically noneffective surface ONS and the image-side optically noneffective surface INS is a surface for bearing force, such as bearing forces during assembly or bearing force when bearing the optical element (or the surface actually in contact with the optical element). Therefore, the surface for bearing force in the object-side optically noneffective surface ONS is referred to as an object-side mechanical surface OMS, and the surface for bearing force in the image-side optically noneffective surface INS is referred to as an image-side mechanical surface IMS. FIG. 2A shows that the areas of the object-side mechanical surface OMS and the image-side mechanical surface IMS are respectively smaller than the areas of the object-side optically noneffective surface ONS and the image-side optically noneffective surface INS. FIG. 2B shows that the areas of the object-side mechanical surface OMS and the image-side mechanical surface IMS are respectively equal to the areas of the object-side optically noneffective surface ONS and the image-side optically noneffective surface INS. Both types of lens elements may be applied to the optical imaging lens of the embodiment of the disclosure. The design of FIG. 2A allows the assembly portion ASP to free up a space, so that the burrs of the optical elements do not touch each other, which has the advantage of higher assembly yield.

It should be noted that the shapes of the surfaces of the lens elements $L_R$, $L_R'$, and L in the drawings of the disclosure are only for illustrative purposes, and are not intended to limit the scope of the disclosure.

The light-shielding element BM is an optical element with the function of shielding light and is, for example, a light-shielding sheet. In this embodiment, the number of light-shielding elements BM is, for example, three, and are respectively labeled as BM1, BM2, and BM3, but the disclosure is not limited thereto. In this embodiment, the material of the light-shielding element BM may be metal with stronger structural strength or plastic with lighter weight and higher manufacturing yield, and the disclosure is also not limited thereto.

The optical ring element 110 is, for example, a fixed ring or other types of supporting elements, and the main function thereof is to provide a supporting force for the lens element L to prevent the lens element L from displacing along the optical axis I. In this embodiment, the optical ring element 110 is located on the side facing the image side A2 of the lens element L closest to the image side A2.

The optical ring element 120 is, for example, a spacer or other types of interval elements, and is used to separate two adjacent lens elements L, so as to maintain a gap between the lens elements L. In this embodiment, the optical ring element 120 is located between the adjacent lens elements L.

During the process of assembling the optical imaging lens 100, the lens barrel 105 and the plurality of lens elements L, the plurality of light-shielding elements BM, and the plurality of optical ring elements 110 and 120 are fixed through an adhesive solvent. In this embodiment, the lens element L has an outer side surface S1. The outer side surface S1 and the lens barrel 105 are fixed by the adhesive solvent (not shown). On the other hand, the optical ring elements 110 and 120 have an outer ring surface S2, and the outer ring surface S2 and the lens barrel 105 are also fixed by the adhesive solvent. It is worth mentioning that the viscosity of the adhesive solvent is between 0.1 Pa·s and 100 Pa·s. However, in the traditional optical imaging lens, the aforementioned viscosity range is prone to sputtering.

Figure 3:
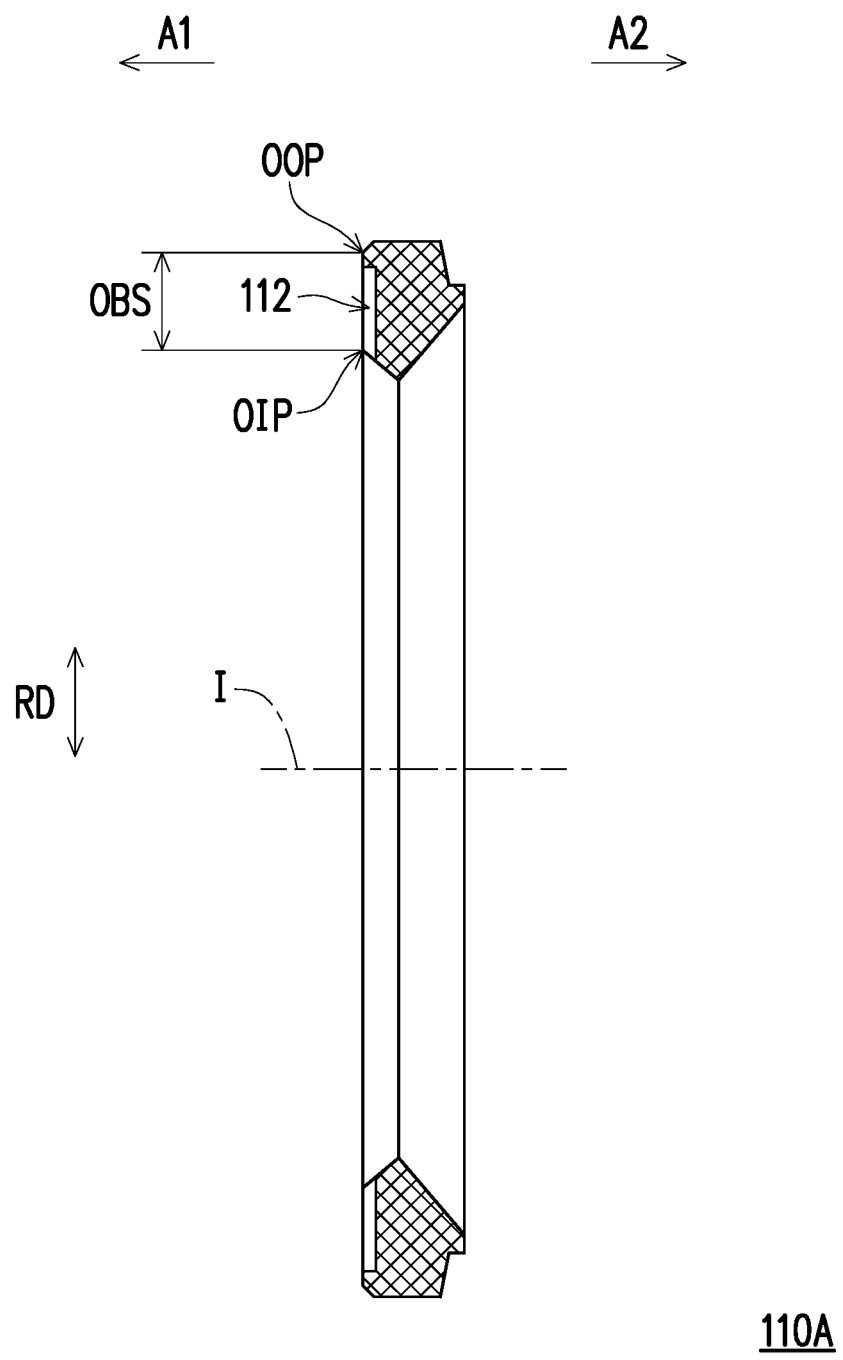
FIG. 3 is a cross-sectional schematic diagram of an optical ring element according to an embodiment of the disclosure.

FIG. 3 is a cross-sectional schematic diagram of an optical ring element according to an embodiment of the disclosure. Please refer to FIG. 3. An optical ring element 110A shown in FIG. 3 may at least be applied to the optical imaging lens 100 shown in FIG. 1, so the following description will take the optical ring element 110A applied to the optical ring element 110 in the optical imaging lens 100 shown in FIG. 1 as an example, but the disclosure is not limited thereto. The optical ring element 110A has an object-side bearing surface OBS facing the object side A1 and in contact with the closest lens element L. The object-side bearing surface OBS has an object-side outer periphery OOP and an object-side inner periphery OIP, and the object-side inner periphery OIP is located between the optical axis I and the object-side outer periphery OOP. In this embodiment, the object-side bearing surface OBS has a groove 112, and the groove 112 extends at least to the object-side inner periphery OIP along a radial direction RD. Specifically, in this embodiment, the groove 112 extends from a position between the object-side inner periphery OIP and the object-side outer periphery OOP at least to the object-side inner periphery OIP along the radial direction RD.

In this way, the design of the groove 112 may provide a passage for the air in the enclosed space formed during the assembly of the lens barrel 105 and the optical ring element 110A to be eliminated, so as to prevent the problem of adhesive solvent sputtering at the cutout of the optical ring element 110A due to failed ventilation of heated and expanded air in the enclosed space during glue dispensing, which affects the optical imaging quality. In this embodiment, the groove 112 is not in contact with any optical element. Therefore, blocking the passage may be prevented to maintain a good exhaust effect. In addition, in this embodiment, the cut line of the bottom of the groove 112 is a straight line in the radial direction RD. Therefore, processing may be made easier.

FIGS. 4A to 4D are respectively top-view schematic diagrams of optical ring elements according to different embodiments of the disclosure. Please refer to FIGS. 4A to 4D at the same time. The optical ring elements 110B, 110C, 110D, and 110E shown in these embodiments are similar to the optical ring element 110A shown in FIG. 3. The difference between the two is that the numbers of grooves 112 shown in FIGS. 4A to 4D are different from each other. In detail, the object-side bearing surface OBS of the optical ring element 110B shown in FIG. 4A has a single groove 112, and the disclosure does not limit the position of the groove 112 on the object-side bearing surface OBS. The number of grooves 112 of the optical ring element 110C shown in FIG. 4B is 2, and the included angle of the grooves 112 with the optical axis I as the center is 180 degrees, which is easier to process and can maintain a good exhaust effect. The number of grooves 112 of the optical ring element 110D shown in FIG. 4C is 3, and the included angle of the grooves 112 with the optical axis I as the center is 120 degrees, which is easier to process and can maintain a good exhaust effect. The number of grooves 112 of the optical ring element 110E shown in FIG. 4D is 4, and the included angle of the grooves 112 with the optical axis I as the center is 90 degrees, which is easier to process and has the best exhaust effect.

In this way, the design of the groove 112 may provide a passage for the air in the enclosed space formed during the assembly of the lens element L, the lens barrel 105, and the optical ring elements 110B, 110C, 110D, and 110E to be eliminated, so as to prevent the problem of adhesive solvent sputtering at a cutout C of the optical ring elements 110B, 110C, 110D, and 110E due to failed ventilation of heated and expanded air in the enclosed space during glue dispensing, which affects the optical imaging quality. In addition, in the optical ring elements 110C, 110D, and 110E, since the number of grooves 112 is greater than or equal to 2, and the grooves 112 are separated, there is a better exhaust effect.

Figure 5:
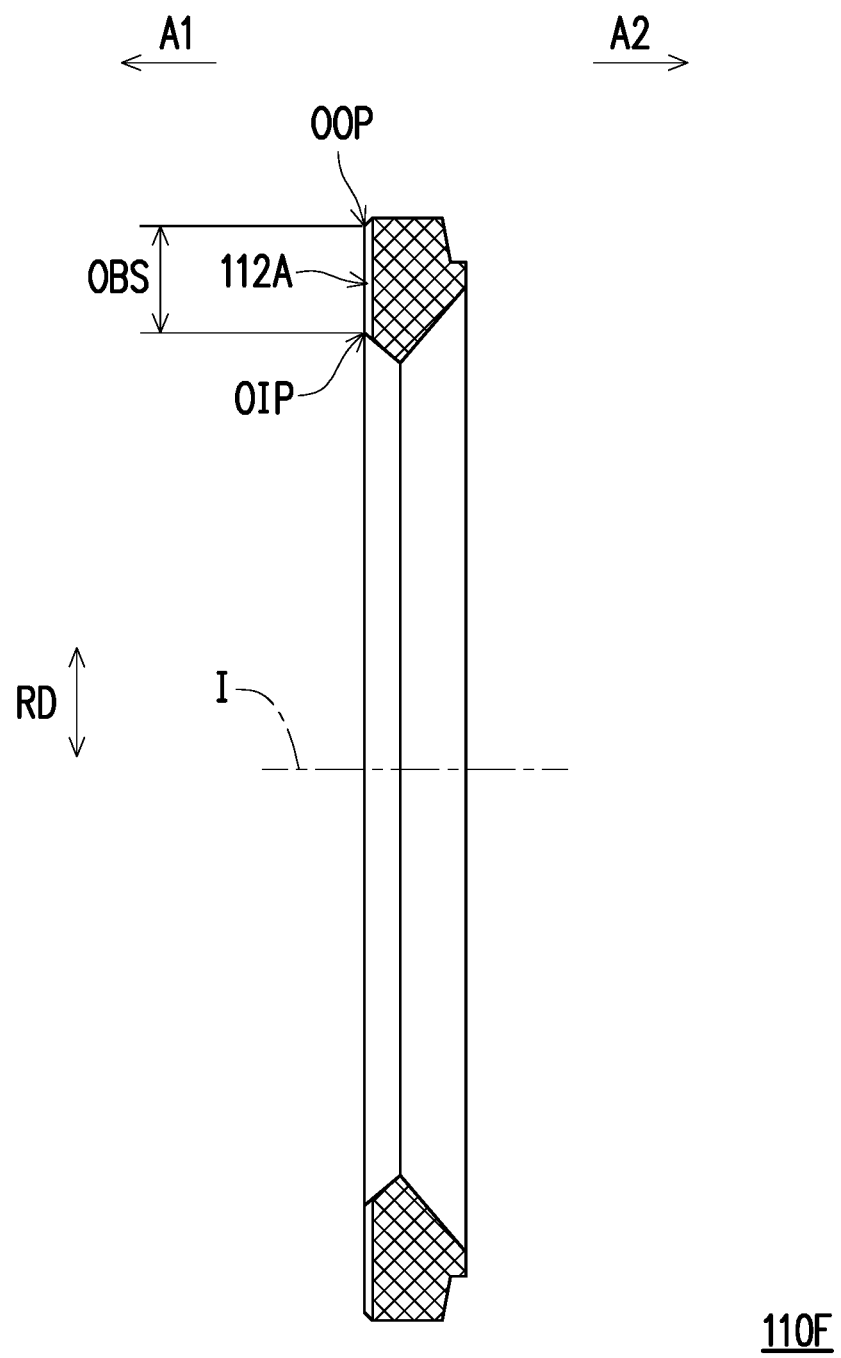
FIG. 5 is a cross-sectional schematic diagram of an optical ring element according to another embodiment of the disclosure.

FIG. 5 is a cross-sectional schematic diagram of an optical ring element according to another embodiment of the disclosure. Please refer to FIG. 5. An optical ring element 110F shown in this embodiment is similar to the optical ring element 110A shown in FIG. 3. The difference between the two is that, in this embodiment, a groove 112A on the object-side bearing surface OBS extends at least from the object-side outer periphery OOP at least to the object-side inner periphery OIP along the radial direction RD. In other words, the length of the groove 112A in the radial direction RD is greater than or equal to the distance between the object-side outer periphery OOP and the object-side inner periphery OIP in the radial direction RD. In this way, the optical ring element 110F of this embodiment has a better exhaust effect.

FIGS. 6A to 6D are respectively top-view schematic diagrams of optical ring elements according to different embodiments of the disclosure. Please refer to FIGS. 6A to 6D at the same time. Optical ring elements 110G, 110H, 110I, and 110J shown in these embodiments are similar to the optical ring element 110F shown in FIG. 5. The difference between the two is that the numbers of grooves 112A shown in FIGS. 6A to 6D are different from each other. In detail, the object-side bearing surface OBS of the optical ring element 110B shown in FIG. 6A has a single groove 112A, and the disclosure does not limit the position of the groove 112 on the object-side bearing surface OBS. The number of grooves 112A of the optical ring element 110H shown in FIG. 6B is 2, and the included angle of the grooves 112A with the optical axis I as the center is 180 degrees, which is easier to process and can maintain a good exhaust effect. The number of grooves 112A of the optical ring element 110I shown in FIG. 6C is 3, and the included angle of the grooves 112A with the optical axis I as the center is 120 degrees, which is easier to process and can maintain a good exhaust effect. The number of grooves 112 of the optical ring element 110J shown in FIG. 6D is 4, and the included angle of the grooves 112A with the optical axis I as the center is 90 degrees, which is easier to process and has the best exhaust effect.

FIGS. 7A to 7D are respectively top-view schematic diagrams of optical ring elements according to different embodiments of the disclosure. Please refer to FIGS. 7A to 7D at the same time. Optical ring elements 110K, 110L, 110M, and 110N shown in these embodiments are similar to the optical ring elements 110B, 110C, 110D and 110E shown in FIGS. 4A to 4D. The difference between the two is that a groove 112B shown in FIGS. 7A to 7D has a different shape. In detail, in these embodiments, the width of the groove 112B perpendicular to the radial direction RD progressively decreases as the distance from the optical axis I increases. That is, in different situations, the groove 112B may be designed as a fan-shaped groove, thereby improving a good exhaust effect, but the disclosure is not limited thereto. The number and configuration of the grooves 112B shown in these embodiments may be referred to the optical ring elements 110B, 110C, 110D, and 110E shown in FIGS. 4A to 4D, which will not be repeated here. In some embodiments, the groove 112B shown in these embodiments may also be designed to extend from the object-side outer periphery OOP to the object-side inner periphery OIP along the radial direction RD, and the disclosure is not limited thereto.

FIGS. 8A to 8D are respectively top-view schematic diagrams of optical ring elements according to different embodiments of the disclosure. Please refer to FIGS. 8A to 8D at the same time. Optical ring elements 110O, 110P, 110Q, and 110R shown in these embodiments are similar to the optical ring elements 110K, 110L, 110M, and 110N shown in FIGS. 7A to 7D. The difference between the two is that the shape of the groove 112C shown in FIGS. 8A to 8D is different. In detail, in these embodiments, the width of the groove 112C perpendicular to the radial direction RD progressively increases as the distance from the optical axis I increases. In this way, the amount of exhaust may be increased by this design, and the effect of improving the problem of adhesive solvent sputtering is better, but the disclosure is not limited thereto.

Figure 9:
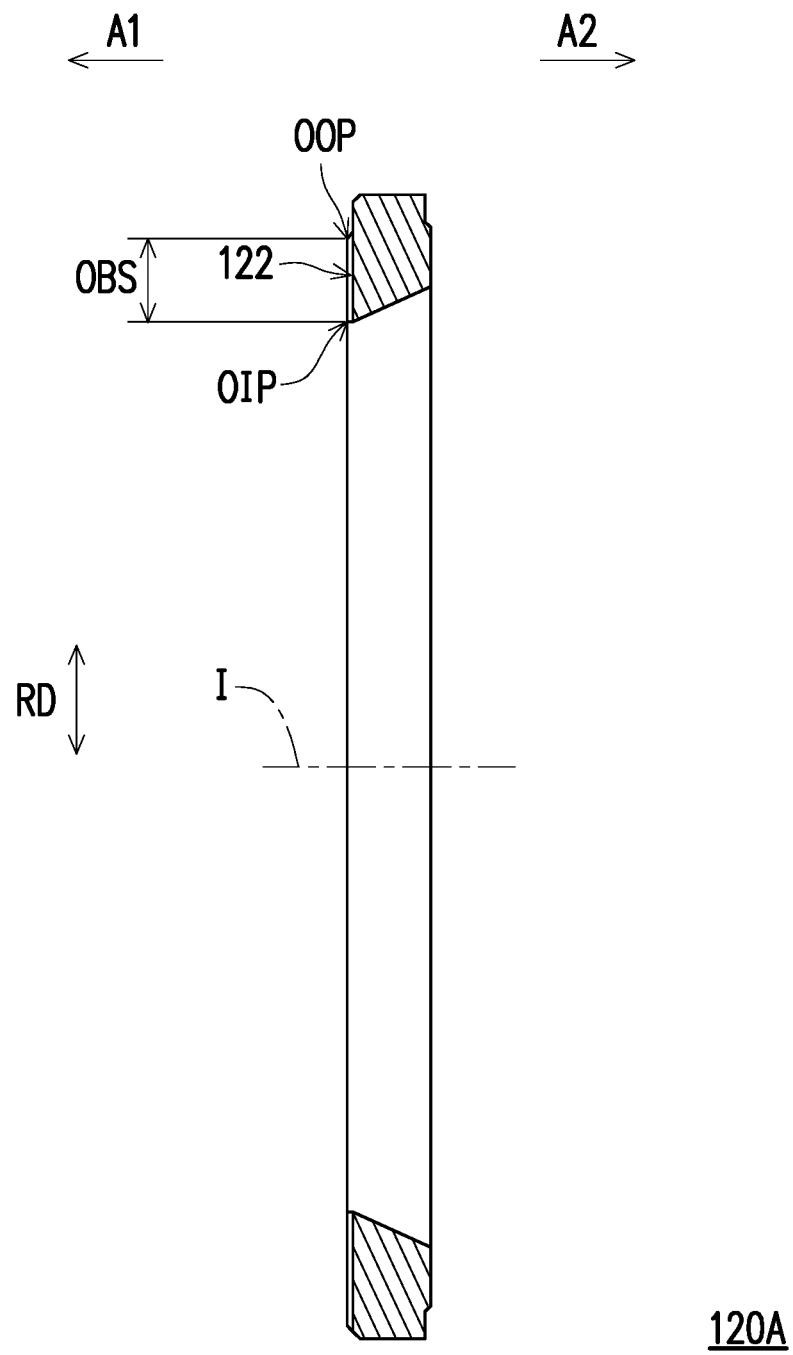
FIG. 9 is a cross-sectional schematic diagram of an optical ring element according to another embodiment of the disclosure.

FIG. 9 is a cross-sectional schematic diagram of an optical ring element according to another embodiment of the disclosure. Please refer to FIG. 9. An optical ring element 120A shown in FIG. 9 may at least be applied to the optical imaging lens 100 shown in FIG. 1, so the following description will take the optical ring element 120A applied to the optical ring element 120 in the optical imaging lens 100 shown in FIG. 1 as an example, but the disclosure is not limited thereto. The optical ring element 120A is located between the adjacent lens elements L. For example, the optical ring element 120A is located between lens elements L3 and L4 in FIG. 1, but the disclosure is not limited thereto. The optical ring element 120A has an object-side bearing surface OBS facing the object side A1 and in contact with the adjacent lens element L. The object-side bearing surface OBS has an object-side outer periphery OOP and an object-side inner periphery OIP, and the object-side inner periphery OIP is located between the optical axis I and the object-side outer periphery OOP. The object-side bearing surface OBS has at least one groove 122, and the groove 122 extends at least from the object-side outer periphery OOP at least to the object-side inner periphery OIP along a radial direction RD. That is, the groove 122 is communicated with the inner side and the outer side of the object-side bearing surface OBS.

In this way, the design of the groove 122 may provide a passage for the air in the enclosed space formed during the assembly of the lens barrel 105 and the optical ring element 120A to be eliminated, so as to prevent the problem of adhesive solvent sputtering at the cutout of the optical ring element 120A due to failed ventilation of heated and expanded air in the enclosed space during glue dispensing, which affects the optical imaging quality. In this embodiment, the groove 122 is not in contact with any optical element. Therefore, blocking the passage may be prevented to maintain a good exhaust effect. In addition, in this embodiment, the cut line of the bottom of the groove 122 is a straight line in the radial direction RD. Therefore, processing may be made easier.

Figure 10:
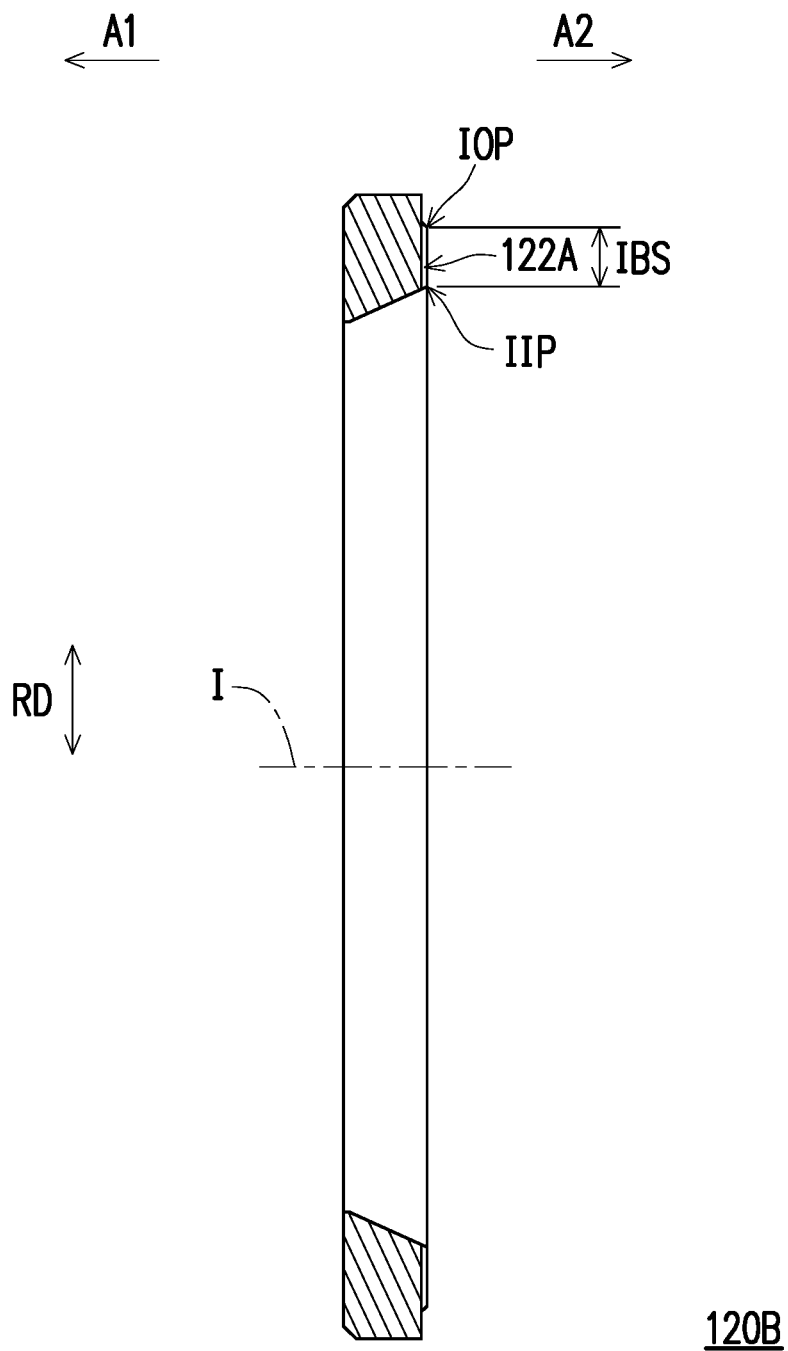
FIG. 10 is a cross-sectional schematic diagram of an optical ring element according to another embodiment of the disclosure.

FIG. 10 is a cross-sectional schematic diagram of an optical ring element according to another embodiment of the disclosure. Please refer to FIG. 10. An optical ring element 120B of this embodiment is similar to the optical ring element 120A shown in FIG. 9. The difference between the two is that, in this embodiment, the optical ring element 120B has an image-side bearing surface IBS facing the image side A2 and in contact with the adjacent lens element L. The image-side bearing surface IBS has an image-side outer periphery IOP and an image-side inner periphery IIP, and the image-side inner periphery IIP is located between the optical axis I and the image-side outer periphery IOP. The image-side bearing surface IBS has at least one groove 122A, and the groove 122A extends at least from the image-side outer periphery IOP at least to the image-side inner periphery IIP along the radial direction RD. That is, the groove 122A is communicated with the inner side and the outer side of the image-side bearing surface IBS. In this way, the design of the groove 112A may provide a passage for the air in the enclosed space formed during the assembly of the lens barrel 105 and the optical ring element 120B to be eliminated, so as to prevent the problem of adhesive solvent sputtering at the cutout C of the optical ring element 120B due to failed ventilation of heated and expanded air in the enclosed space during glue dispensing, which affects the optical imaging quality.

Figure 11A:
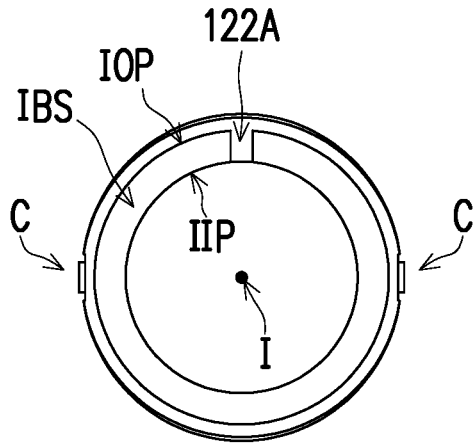
FIGS. 11A to 11D are respectively top-view schematic diagrams of optical ring elements according to different embodiments of the disclosure.
Figure 11B:
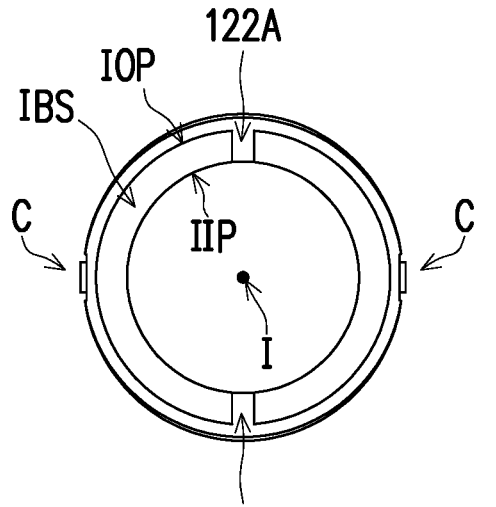
Figure 11C:
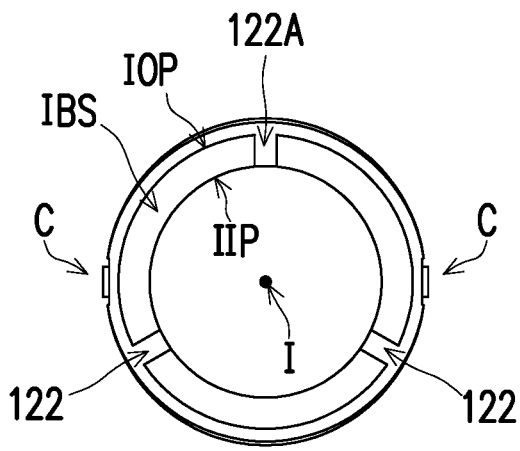
Figure 11D:
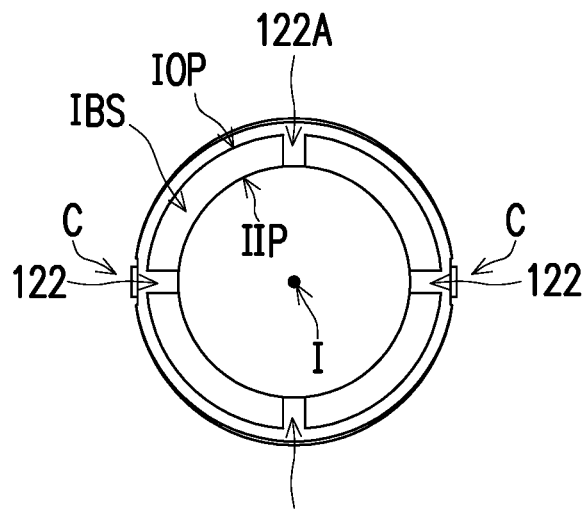

FIGS. 11A to 11D are respectively top-view schematic diagrams of optical ring elements according to different embodiments of the disclosure. Please refer to FIGS. 11A to 11D at the same time. Optical ring elements 120C, 120D, 120E, and 120F shown in these embodiments are similar to the optical ring element 120B shown in FIG. 10. The difference between the two is that the numbers of grooves 122A shown in FIGS. 11A to 11D are different from each other. In detail, the image-side bearing surface IBS of the optical ring element 120C shown in FIG. 11A has a single groove 122A, and the disclosure does not limit the position of the groove 122A on the image-side bearing surface IBS. The number of grooves 122A of the optical ring element 120D shown in FIG. 11B is 2, and the included angle of the grooves 122A with the optical axis I as the center is 180 degrees, which is easier to process and can maintain a good exhaust effect. The number of grooves 122A of the optical ring element 120E shown in FIG. 11C is 3, and the included angle of the grooves 122A with the optical axis I as the center is 120 degrees, which is easier to process and can maintain a good exhaust effect. The number of grooves 122A of the optical ring element 120F shown in FIG. 11D is 4, and the included angle of the grooves 122A with the optical axis I as the center is 90 degrees, which is easier to process and has the best exhaust effect.

Figure 12:
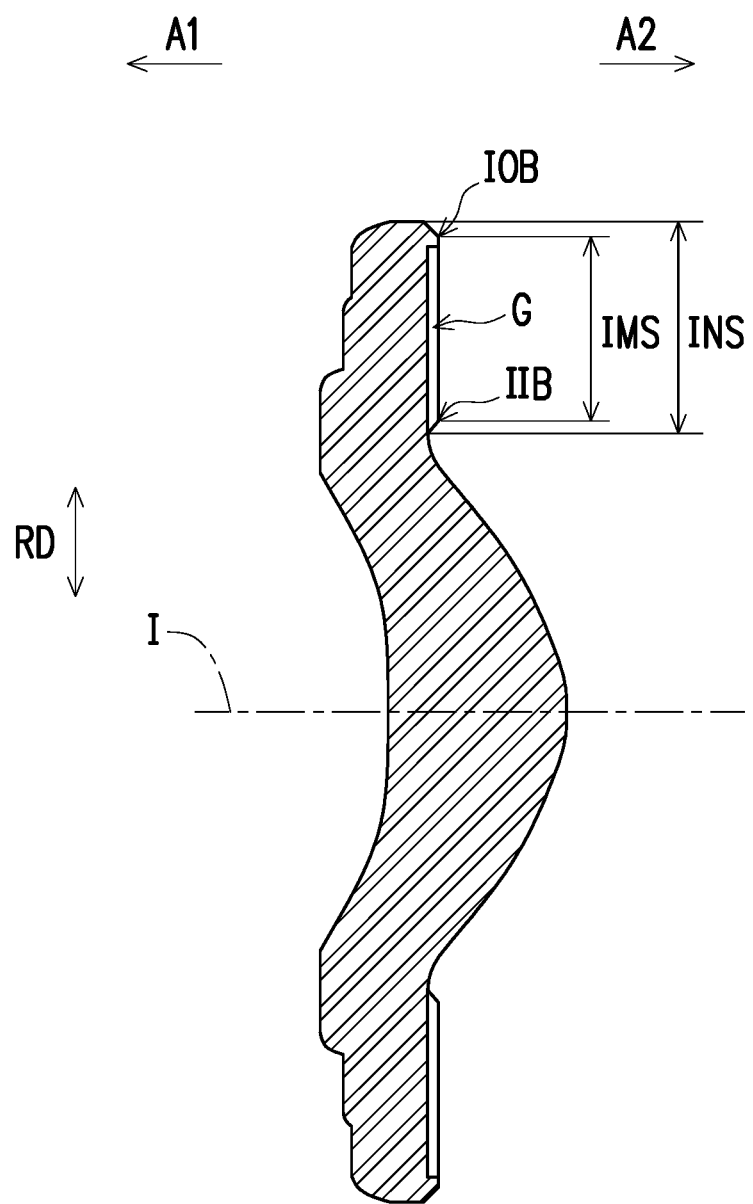
FIG. 12 is a cross-sectional schematic diagram of a lens element according to an embodiment of the disclosure.

FIG. 12 is a cross-sectional schematic diagram of a lens element according to an embodiment of the disclosure. Please refer to FIG. 12. A lens element L6 shown in FIG. 12 may at least be applied to the optical imaging lens 100 shown in FIG. 1, so the following description will take the lens element L6 applied to the lens element L2 in the optical imaging lens 100 shown in FIG. 1 as an example, but the disclosure is not limited thereto. In this embodiment, the image-side optically noneffective surface INS of the lens element L6 has an image-side mechanical surface IMS. The image-side mechanical surface IMS has an image-side outer boundary IOB and an image-side inner boundary IIB, and the image-side inner boundary IIB is located between the optical axis I and the image-side outer boundary JOB. The image-side mechanical surface IMS has at least one groove G, and the groove G extends from a position between the image-side outer boundary IOB and the image-side inner boundary IIB out of the image-side inner boundary IIB to a region of a non-image-side mechanical surface IMS in the image-side optically noneffective surface INS along the radial direction RD. In actual implementation, the length of the groove G in the radial direction RD may be greater than or equal to the length of the image-side mechanical surface IMS in the radial direction RD. In other words, the groove G may also extend through at least one of the image-side outer boundary IOB and the image-side inner boundary IIB. However, in different embodiments, the groove G may be selectively disposed on the object-side mechanical surface, and the disclosure is not limited thereto.

In this way, the design of the groove G may provide a passage for the air formed in the enclosed space during assembly of the lens barrel 105 and the lens element L6 to be eliminated, so as to prevent the problem of adhesive solvent sputtering at the cutout of the lens element L6 due to failed ventilation of heated and expanded air in the enclosed space during glue dispensing, which affects the optical imaging quality. In this embodiment, the groove 112 is not in contact with any optical element. Therefore, blocking the passage may be prevented to maintain a good exhaust effect. In addition, in this embodiment, the cut line of the bottom of the groove G is a straight line in the radial direction RD. Therefore, processing may be made easier.

Figure 13A:
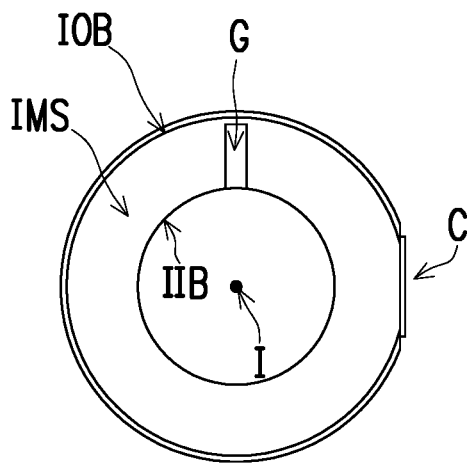
FIGS. 13A to 13D are respectively top-view schematic diagrams of lens elements according to different embodiments of the disclosure.
Figure 13B:
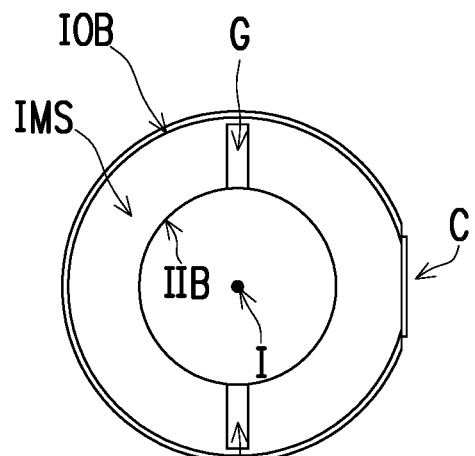
Figure 13C:
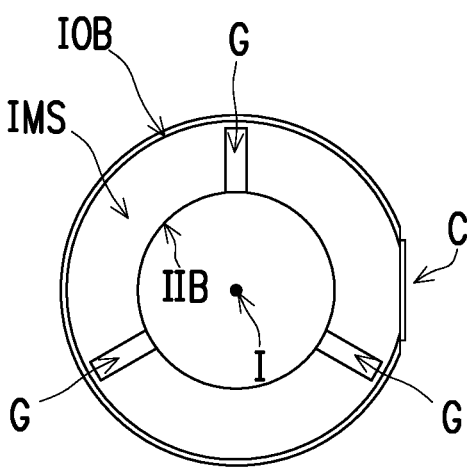
Figure 13D:
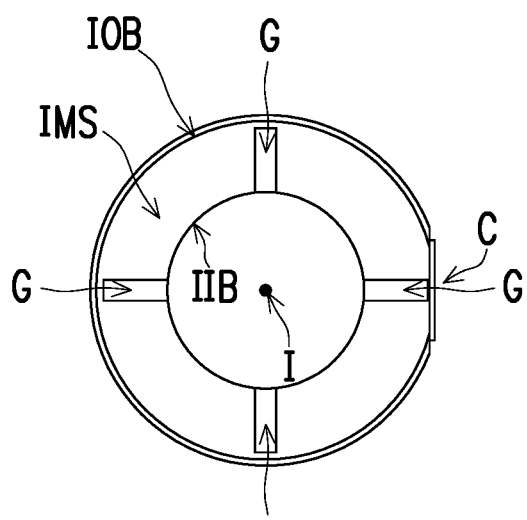

FIGS. 13A to 13D are respectively top-view schematic diagrams of lens elements according to different embodiments of the disclosure. Please refer to FIGS. 13A to 13D at the same time. Lens elements L7, L8, L9, and L10 shown in these embodiments are similar to the lens element L6 shown in FIG. 12. The difference between the two is that the numbers of grooves G shown in FIGS. 13A to 13D are different from each other. In detail, the image-side mechanical surface IMS of the lens element L7 shown in FIG. 13A has a single groove G, and the disclosure does not limit the position of the groove G on the image-side mechanical surface IMS. The number of grooves G of the lens element L8 shown in FIG. 13B is 2, and the included angle of the grooves G with the optical axis I as the center is 180 degrees, which is easier to process and can maintain a good exhaust effect. The number of grooves G of the lens element L9 shown in FIG. 13C is 3, and the included angle of the grooves G with the optical axis I as the center is 120 degrees, which is easier to process and can maintain a good exhaust effect. The number of grooves G of the lens element L10 shown in FIG. 13D is 4, and the included angle of the grooves G with the optical axis I as the center is 90 degrees, which is easier to process and has the best exhaust effect. However, in different embodiments, the groove G may be selectively disposed on the object-side optically noneffective surface, and the disclosure is not limited thereto.

Figure 14:
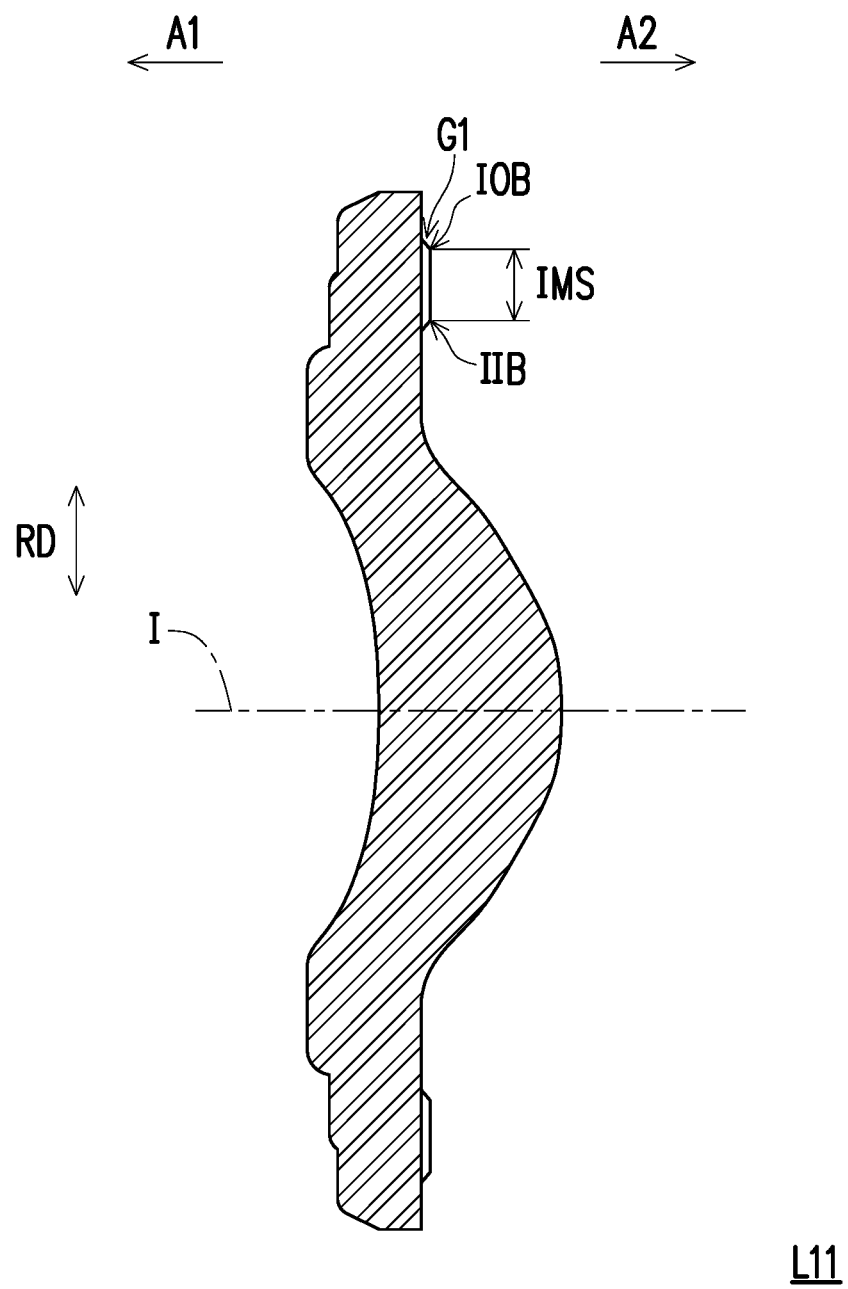
FIG. 14 is a cross-sectional schematic diagram of a lens element according to another embodiment of the disclosure.

FIG. 14 is a cross-sectional schematic diagram of a lens element according to another embodiment of the disclosure. Please refer to FIG. 14. A lens element L11 of this embodiment is similar to the lens element L6 shown in FIG. 12. The difference between the two is that, in this embodiment, a groove G1 on the image-side mechanical surface IMS extends at least from the image-side outer boundary IOB at least to the image-side inner boundary IIB along the radial direction RD. In other words, the length of the groove G1 in the radial direction RD is greater than or equal to the distance between the image-side outer boundary IOB and the image-side inner boundary IIB in the radial direction RD. In this way, the lens element L11 of this embodiment has a better exhaust effect. However, in different embodiments, the groove G1 can be selectively disposed on the object-side optically noneffective surface, and the disclosure is not limited thereto.

Figure 15A:
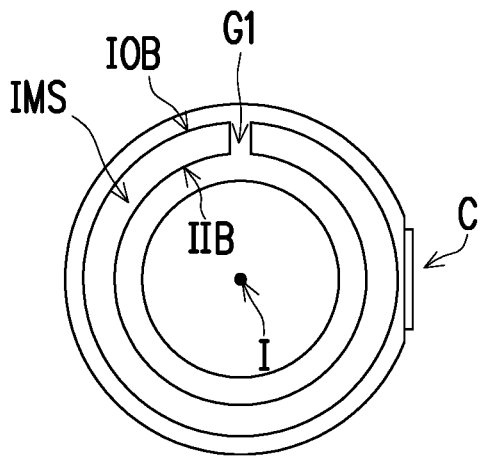
FIGS. 15A to 15D are respectively top-view schematic diagrams of lens elements according to different embodiments of the disclosure.
Figure 15B:
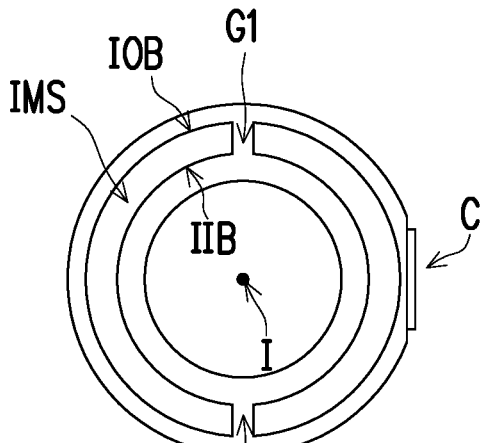
Figure 15C:
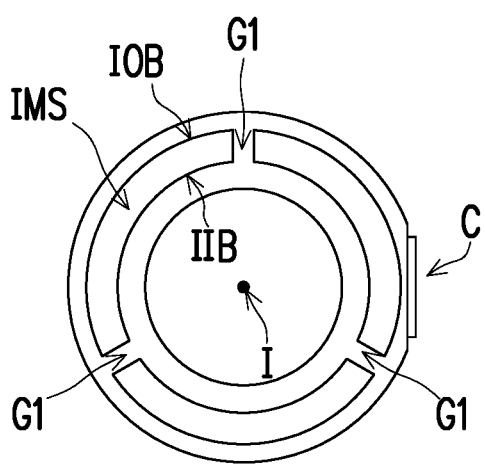
Figure 15D:
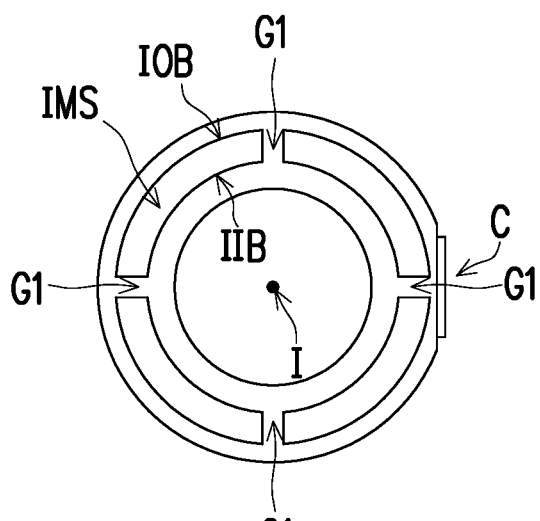

FIGS. 15A to 15D are respectively top-view schematic diagrams of lens elements according to different embodiments of the disclosure. Please refer to FIGS. 15A to 15D at the same time. Lens elements L12, L13, L14, and L15 shown in these embodiments are similar to the lens element L11 shown in FIG. 14. The difference between the two is that the numbers of grooves G1 shown in FIGS. 15A to 15D are different from each other. In detail, the image-side mechanical surface IMS of the lens element L12 shown in FIG. 15A has a single groove G1, and the disclosure does not limit the position of the groove G1 on the image-side mechanical surface IMS. The number of grooves G1 of the lens element L13 shown in FIG. 15B is 2, and the included angle of the grooves G1 with the optical axis I as the center is 180 degrees, which is easier to process and can maintain a good exhaust effect. The number of grooves G1 of the lens element L14 shown in FIG. 15C is 3, and the included angle of the grooves G1 with the optical axis I as the center is 120 degrees, which is easier to process and can maintain a good exhaust effect. The number of grooves G1 of the lens element L15 shown in FIG. 15D is 4, and the included angle of the grooves G1 with the optical axis I as the center is 90 degrees, which is easier to process and has the best exhaust effect. However, in different embodiments, the groove G1 may be selectively disposed on the object-side optically noneffective surface, and the disclosure is not limited thereto.

Figure 16:
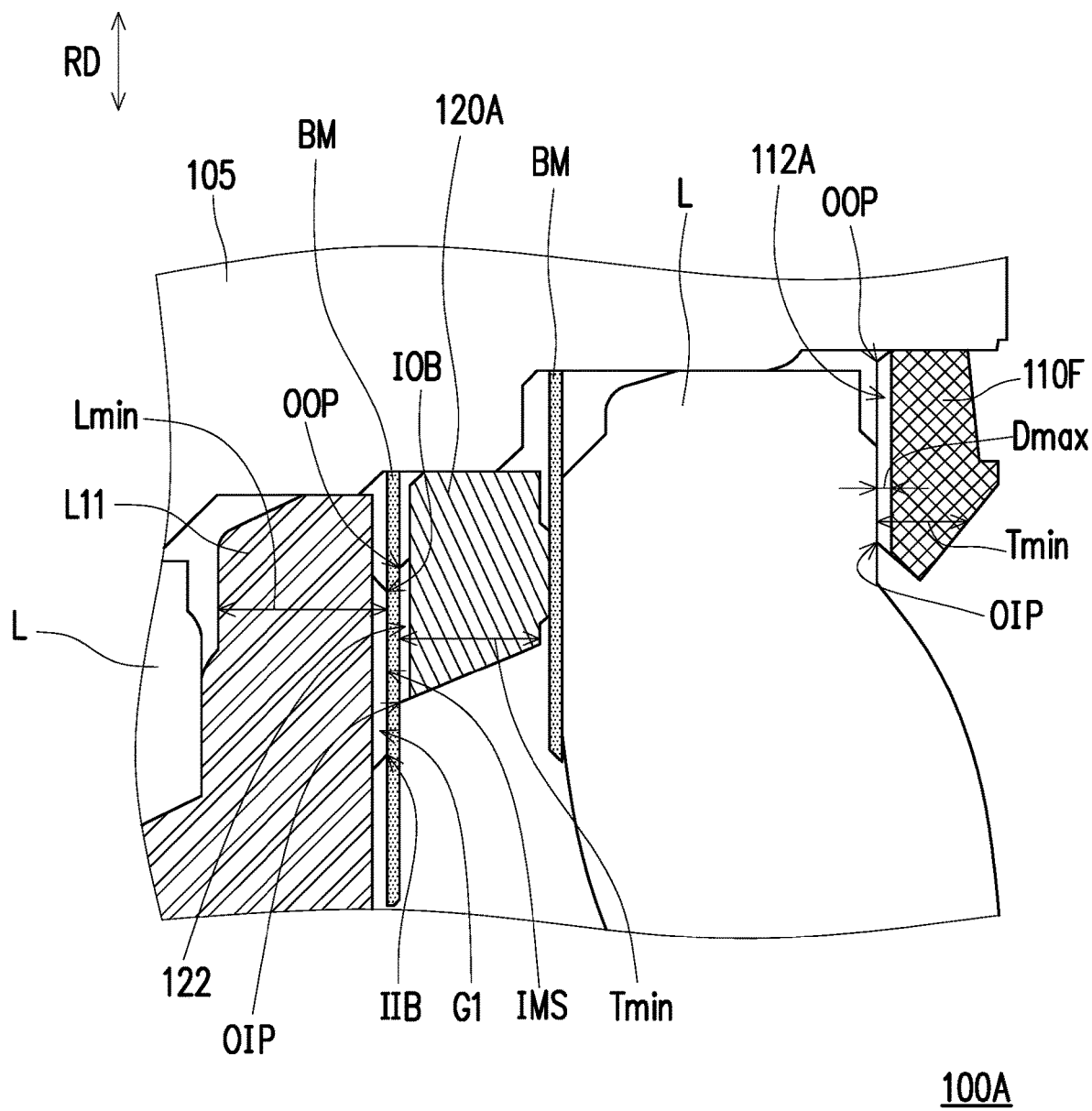
FIG. 16 is a cross-sectional schematic diagram of an optical imaging lens according to another embodiment of the disclosure.

FIG. 16 is a cross-sectional schematic diagram of an optical imaging lens according to another embodiment of the disclosure. Please refer to FIG. 16. An optical imaging lens 100A shown in this embodiment is a combination example combining different embodiments relevant to the lens elements and the optical ring elements in the above descriptions. In detail, in this embodiment, an optical ring element 110F is, for example, a fixed ring, bearing the lens element L. The object-side bearing surface of the optical ring element 110F has a groove 112A, and the groove 112A extends at least from the object-side outer periphery OOP at least to the object-side inner periphery OIP along a radial direction RD. The optical ring element 120A located between the lens element L and the lens element L11 is, for example, a spacer. The object-side bearing surface of the optical ring element 120A has a groove 122, and the groove 122 extends at least from the object-side outer periphery OOP at least to the object-side inner periphery OIP along the radial direction RD. The image-side mechanical surface IMS of the lens element L11 has a groove G1, and the length of the groove G1 in the radial direction RD is greater than or equal to the length of the image-side mechanical surface IMS in the radial direction RD. In this way, the design of the grooves 112A, 122, and G1 may provide a passage for the air in the enclosed space formed during the assembly of the lens barrel 105, the two optical ring elements 110F and 120A, and the lens elements L and L11 to be eliminated, so as to prevent the problem of adhesive solvent sputtering at the cutout of the optical elements due to failed ventilation of heated and expanded air in the enclosed space during glue dispensing, which affects the optical imaging quality. In different embodiments, the specific form of the groove structure of any of the optical elements (that is, the optical ring elements 110F and 120A or the lens element L11) may be based on the production requirements of the optical imaging lens 100A and is not limited to be implemented at the same time. The best configuration may be selected by referring to the aforementioned implementations, and the disclosure is not limited thereto.

Figure 17:
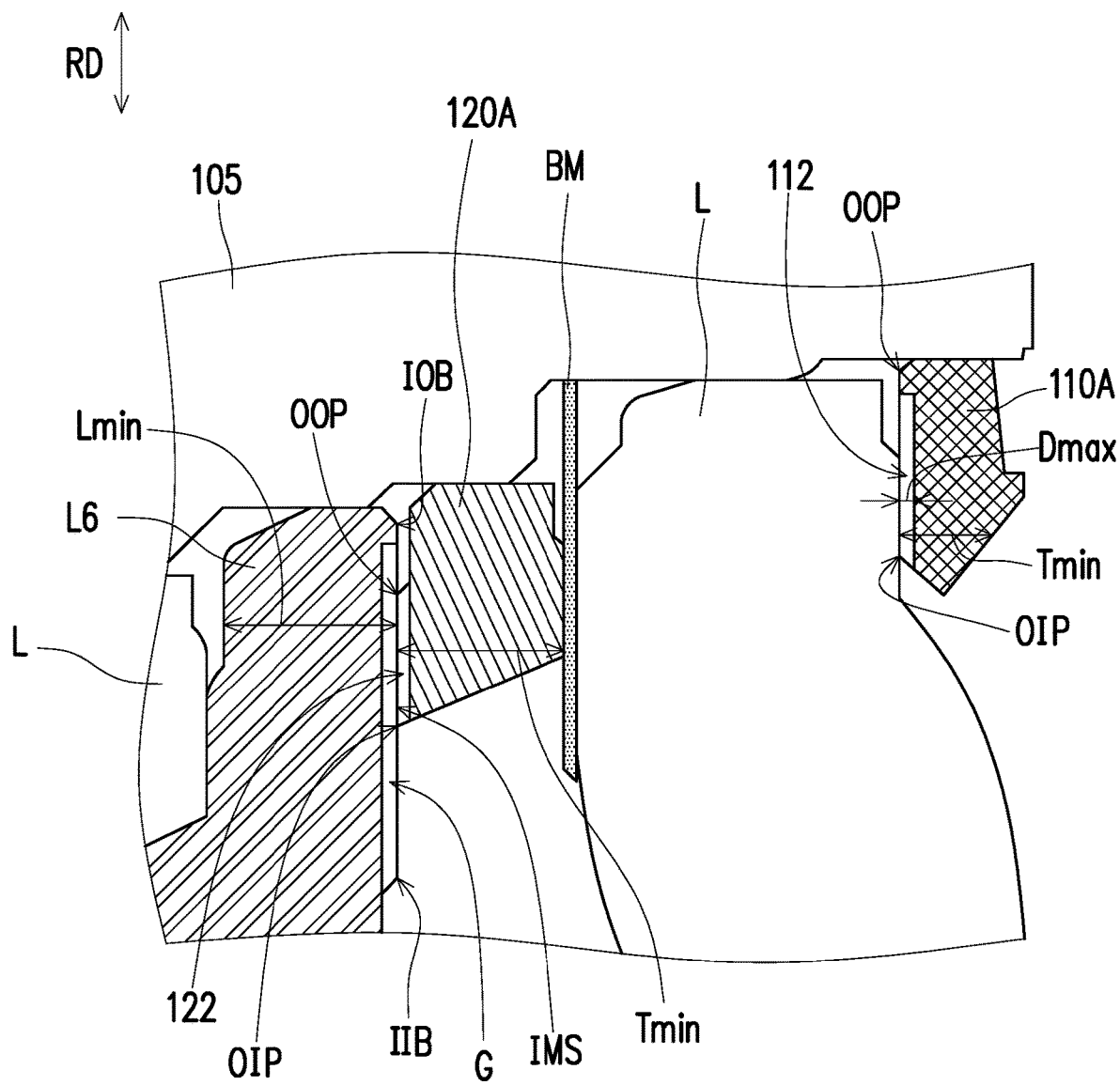
FIG. 17 is a cross-sectional schematic diagram of an optical imaging lens according to another embodiment of the disclosure.

FIG. 17 is a cross-sectional schematic diagram of an optical imaging lens according to another embodiment of the disclosure. Please refer to FIG. 17. An optical imaging lens 100B shown in this embodiment is a combination example combining different embodiments relevant to the lens elements and the optical ring elements in the above descriptions. In detail, in this embodiment, an optical ring element 110A is, for example, a fixed ring, bearing the lens element L. The object-side bearing surface of the optical ring element 110A has a groove 112, and the groove 112 extends from a position between the object-side outer periphery OOP and the object-side inner periphery OIP at least to the object-side inner periphery OIP along the radial direction RD. The optical ring element 120A located between the lens element L and the lens element L6 is, for example, a spacer similar to the optical ring element 120A shown in FIG. 16. The image-side mechanical surface IMS of the lens element L6 has a groove G, and the length of the groove G in a radial direction RD is greater than or equal to the length of the image-side mechanical surface IMS in the radial direction RD. In this way, the design of the grooves 112, 122, and G may provide a passage for the air in the enclosed space formed during the assembly of the lens barrel 105, the two optical ring elements 110A and 120A, and the lens elements L and L6 to be eliminated, so as to prevent the problem of adhesive solvent sputtering at the cutout C of the optical elements due to failed ventilation of heated and expanded air in the enclosed space during glue dispensing, which affects the optical imaging quality.

Figure 7A:
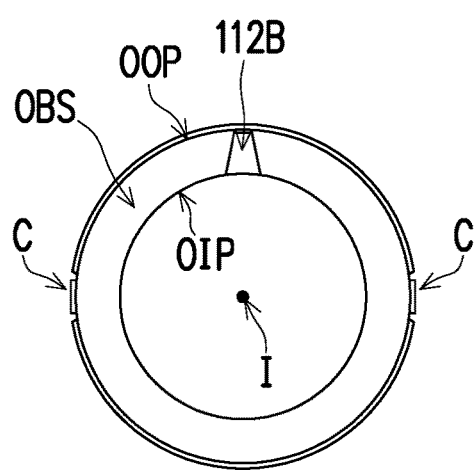
FIGS. 7A to 7D are respectively top-view schematic diagrams of optical ring elements according to different embodiments of the disclosure.
Figure 7B:
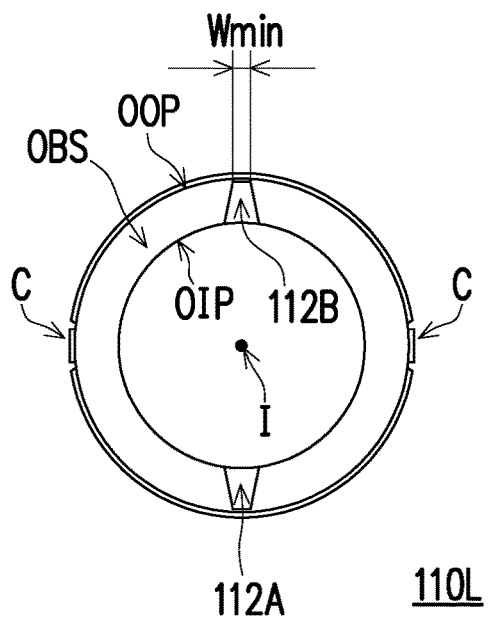
Figure 7C:
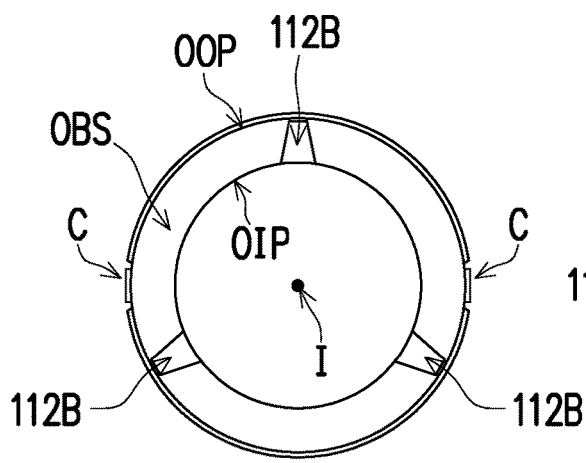
Figure 7D:
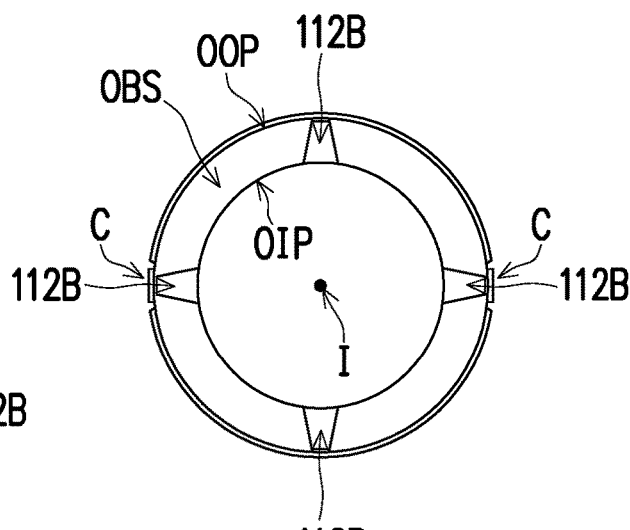
Figure 8A:
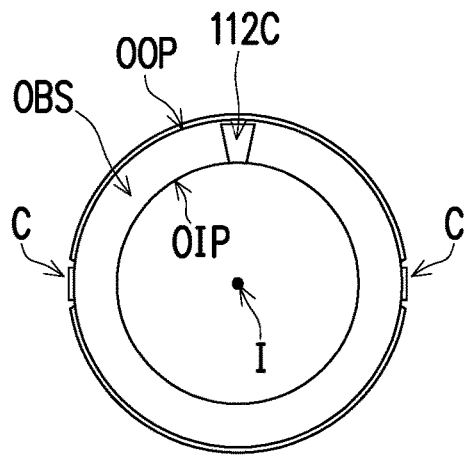
FIGS. 8A to 8D are respectively top-view schematic diagrams of optical ring elements according to different embodiments of the disclosure.
Figure 8B:
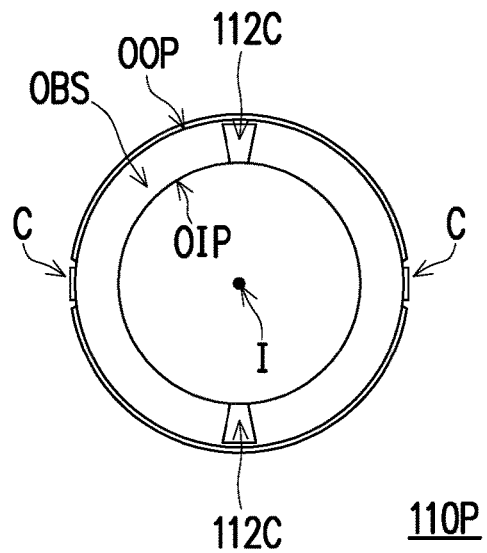
Figure 8C:
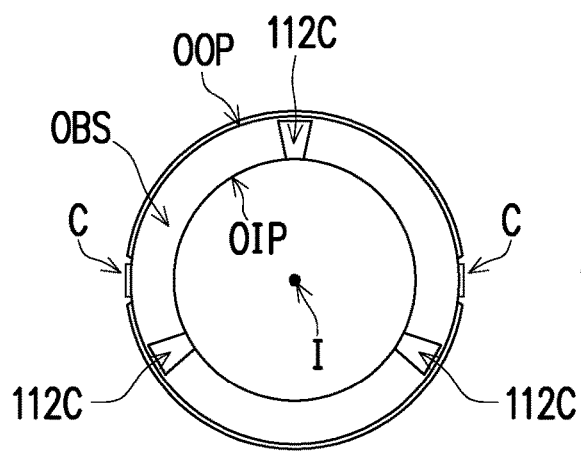
Figure 8D:
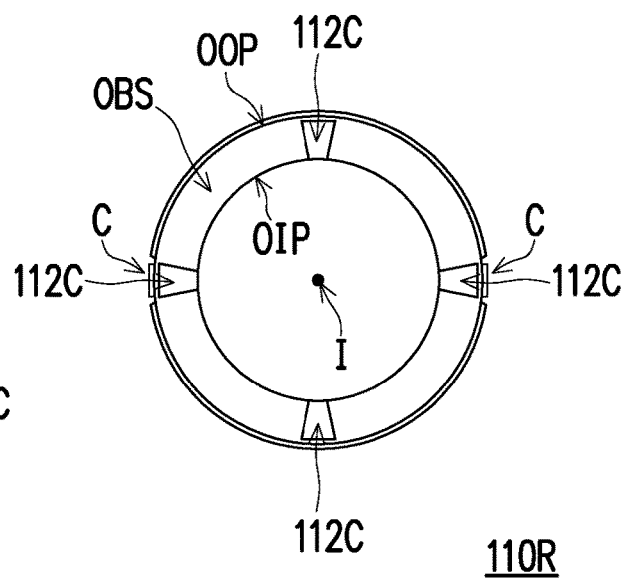

In addition, the relationship (minimum thicknesses Tmin and Lmin, maximum depth Dmax, and minimum width Wmin respectively shown in FIGS. 7B, 16, and 17) between the important parameters in the lens elements or the optical ring elements of the embodiment described above are as follows:

where,

Tmin is the minimum thickness of the optical ring element from the object-side bearing surface along the direction of the optical axis;

Dmax is the maximum depth of the groove along the direction of the optical axis;

Lmin is the minimum thickness of the lens element from the object-side mechanical surface along the direction of the optical axis; and Wmin is the minimum width of at least one groove in a direction perpendicular to the radial direction (as shown in FIG. 7B).

In addition, in order to achieve better optical quality while considering the difficulty of production, if the numerical limits of the following conditional formulae are satisfied, any of the above-mentioned embodiments of the disclosure can have a better configuration.

In an embodiment, the optical imaging lens may meet $0.050$ mm≤Tmin≤$0.500$ mm;

the optical imaging lens may meet $0.005$ mm≤Dmax≤$0.100$ mm; and the optical imaging lens may meet $0.150$ mm≤Lmin≤$1.000$ mm.

In addition, the optical imaging lens may meet $0.500$≤Tmin/Dmax≤$100.000$;

the optical imaging lens may meet $1.500$≤Lmin/Dmax≤$200.000$; and the optical imaging lens may meet $2.000$≤Wmin/Dmax≤$40.000$.

The above-mentioned exemplary limiting relationship expressions may also arbitrarily and selectively combine varying numbers to be applied to the embodiments of the disclosure, which are not limited thereto. It should be noted that these details need to be selectively combined to be applied to other embodiments of the disclosure without conflict.

In summary, the optical imaging lens of the embodiments of the disclosure may achieve the following effects and advantages:

1. The object-side bearing surface of the optical ring element of the embodiments of the disclosure in contact with the last lens element from the object side to the image side is provided with at least one groove radially extending at least to the object-side inner periphery, which may provide a passage for the air in the enclosed space formed during assembly of the lens element, lens barrel, and optical ring element to be eliminated, so as to prevent the problem of adhesive solvent sputtering at the cutout of the optical ring element due to failed ventilation of heated and expanded air in the enclosed space during glue dispensing, which affects the optical imaging quality. The design of the groove radially extending from the object-side outer periphery to the object-side inner periphery has a better exhaust effect.

2. The optical ring element of the embodiments of the disclosure is arranged between two adjacent lens elements. The object-side bearing surface or the image-side bearing surface of the optical ring element in contact with the lens element is provided with at least one groove extending at least from the object-side inner periphery at least to the object-side outer periphery or at least from the image-side inner periphery at least to the image-side outer periphery, which may provide a passage for the air in the enclosed space formed during the assembly of the lens element, the lens barrel, and the optical ring element to be eliminated, so as to prevent the problem of adhesive solvent sputtering at the cutout of the optical ring element due to failed ventilation of heated and expanded air in the enclosed space during glue dispensing, which affects the optical imaging quality.

3. The object-side mechanical surface or the image-side mechanical surface of the lens element of the embodiments of the disclosure is provided with at least one groove radially extending to the inner boundary, which may provide a passage for the air in the enclosed space formed during assembly of the lens element, lens barrel, and optical ring element to be eliminated, so as to prevent the problem of adhesive solvent sputtering at the cutout of the lens element due to failed ventilation of heated and expanded air in the enclosed space during glue dispensing, which affects the optical imaging quality. The design of the groove radially extending from the outer boundary to the inner boundary has a better exhaust effect.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be determined by the scope of the appended claims.

What is claimed is:

1. An optical imaging lens, sequentially comprising at least one lens element and an optical ring element from an object side to an image side along an optical axis, wherein
the optical ring element is located on a side facing the image side of the lens element closest to the image side and has an object-side bearing surface facing the object side and in contact with the closest lens element;
the object-side bearing surface has an object-side outer periphery and an object-side inner periphery, and the object-side inner periphery is located between the optical axis and the object-side outer periphery; and
the object-side bearing surface has at least one groove, and the at least one groove extends at least to the object-side inner periphery along a radial direction.

2. The optical imaging lens according to claim 1, wherein the at least one groove extends at least from the object-side outer periphery at least to the object-side inner periphery along the radial direction.

3. The optical imaging lens according to claim 1, wherein the optical imaging lens further satisfies a following conditional formula: 0.500≤Tmin/Dmax≤100.000, where Tmin is a minimum thickness of the optical ring element from the object-side bearing surface along a direction of the optical axis, and Dmax is a maximum depth of the at least one groove along the direction of the optical axis.

4. The optical imaging lens according to claim 1, wherein the optical ring element has an outer ring surface, and the outer ring surface and a lens barrel are fixed by an adhesive solvent.

5. The optical imaging lens according to claim 1, wherein a width of the at least one groove perpendicular to the radial direction progressively increases as a distance from the optical axis increases.

6. The optical imaging lens according to claim 1, wherein a width of the at least one groove perpendicular to the radial direction progressively decreases as a distance from the optical axis increases.

7. An optical imaging lens, comprising a plurality of lens elements and an optical ring element sequentially arranged from an object side to an image side along an optical axis, wherein
the optical ring element is located between adjacent lens elements among the plurality of the lens elements;
the optical ring element has an object-side bearing surface and an image-side bearing surface respectively facing the object side and the image side and in contact with the plurality of lens elements;
the object-side bearing surface has an object-side outer periphery and an object-side inner periphery, and the object-side inner periphery is located between the optical axis and the object-side outer periphery;
the image-side bearing surface has an image-side outer periphery and an image-side inner periphery, and the image-side inner periphery is located between the optical axis and the image-side outer periphery; and
at least one of the object-side bearing surface and the image-side bearing surface has at least one groove, and the at least one groove extends at least from the object-side outer periphery at least to the object-side inner periphery along a radial direction or extends at least from the image-side outer periphery at least to the image-side inner periphery along the radial direction.

8. The optical imaging lens according to claim 7, wherein the optical imaging lens further satisfies a following conditional formula: 0.500≤Tmin/Dmax≤100.000, where Tmin is a minimum thickness of the optical ring element from the object-side bearing surface along a direction of the optical axis, and Dmax is a maximum depth of the at least one groove along the direction of the optical axis.

9. The optical imaging lens according to claim 7, wherein the optical ring element has an outer ring surface, and the outer ring surface and a lens barrel are fixed by an adhesive solvent.

10. The optical imaging lens according to claim 7, wherein the optical imaging lens further satisfies a following conditional formula: 2.000≤Wmin/Dmax≤40.000, where Wmin is a minimum width of the at least one groove perpendicular to a direction of the radial direction, and Dmax is a maximum depth of the at least one groove along a direction of the optical axis.

11. An optical imaging lens, comprising at least one lens element, wherein each of the at least one lens element has an object-side mechanical surface and an image-side mechanical surface respectively facing an object side and an image side, and the object-side mechanical surface and the image-side mechanical surface are both used to receive a bearing force, wherein
the object-side mechanical surface has an object-side outer boundary and an object-side inner boundary, and the object-side inner boundary is located between an optical axis and the object-side outer boundary;

the image-side mechanical surface has an image-side outer boundary and an image-side inner boundary, and the image-side inner boundary is located between the optical axis and the image-side outer boundary; and at least one of the object-side mechanical surface and the image-side mechanical surface has at least one groove, and a length of the at least one groove in a radial direction is greater than or equal to a length of at least one of the object-side mechanical surface and the image-side mechanical surface in the radial direction.

12. The optical imaging lens according to claim 11, wherein the optical imaging lens further satisfies a following conditional formula: 1.500≤Lmin/Dmax≤200.000, where Lmin is a minimum thickness of the at least one lens element from the object-side mechanical surface along a direction of the optical axis, and Dmax is a maximum depth of the at least one groove along the direction of the optical axis.

13. The optical imaging lens according to claim 11, wherein the at least one lens element has an outer side surface, and the outer side surface and a lens barrel are fixed by an adhesive solvent.

14. The optical imaging lens according to claim 11, wherein a number of the at least one groove is 2, and an included angle of the grooves with the optical axis as a center is 180.000 degrees.

15. The optical imaging lens according to claim 11, wherein a number of the at least one groove is 3, and an included angle of the grooves with the optical axis as a center is 120.000 degrees.

16. The optical imaging lens according to claim 11, wherein a number of the at least one groove is 4, and an included angle of the grooves with the optical axis as a center is 90.000 degrees.

17. The optical imaging lens according to claim 11, wherein the at least one groove is not in contact with an optical element.

18. The optical imaging lens according to claim 11, wherein a cut line of a bottom of the at least one groove is a straight line in the radial direction.

19. The optical imaging lens according to claim 11, wherein the at least one lens element further has an object-side optically noneffective surface facing the object side and an image-side optically noneffective surface facing the image side, the object-side optically noneffective surface comprises the object-side mechanical surface, the image-side optically noneffective surface comprises the image-side mechanical surface, and an area of the object-side mechanical surface is smaller than the object-side optically noneffective surface, and an area of the image-side mechanical surface is smaller than the image-side optically noneffective surface.

20. The optical imaging lens according to claim 11, wherein the optical imaging lens further satisfies a following conditional formula: 2.000≤Wmin/Dmax≤40.000, where Wmin is a minimum width of the at least one groove perpendicular to the radial direction, and Dmax is a maximum depth of the at least one groove along a direction of the optical axis.

* * * * *